Nov. 26, 1929.                P. C. WEGO                1,737,036
              LUBRICATING MEANS FOR CONVEYER ROLLERS
                         Filed June 9, 1928
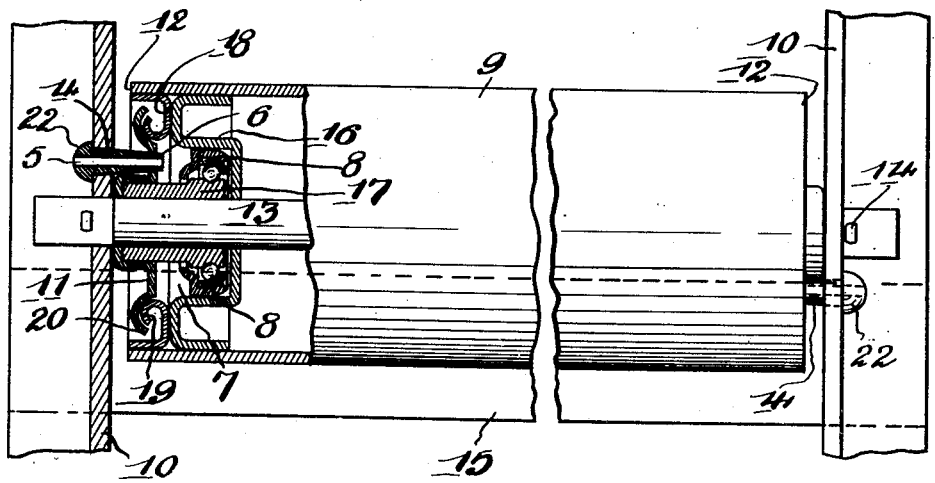
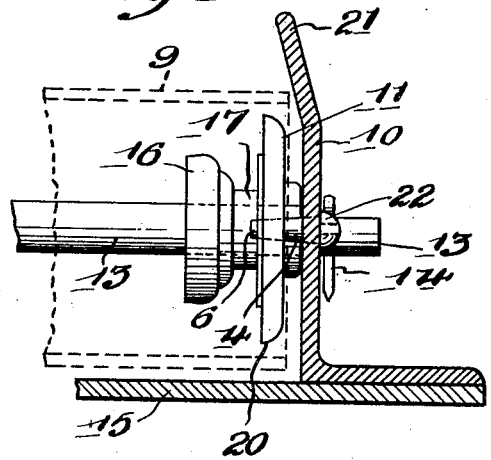
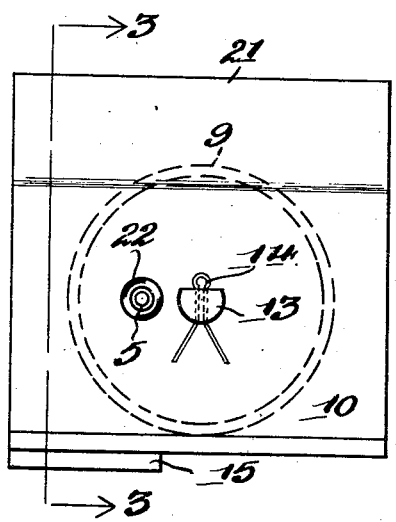
Inventor
Peter C. Wego
By Stryker & Stryker
Attorneys Patented Nov. 26, 1929

1,737,036

UNITED STATES PATENT OFFICE

PETER C. WEGO, OF ST. PAUL, MINNESOTA, ASSIGNOR TO STANDARD CONVEYOR COMPANY, OF ST. PAUL, MINNESOTA, A CORPORATION OF MINNESOTA

LUBRICATING MEANS FOR CONVEYER ROLLERS

Application filed June 9, 1928. Serial No. 284,071.

This invention relates to improvements in the protected bearings for conveyer rollers described and claimed in my copending application, Serial No. 207,414, filed in the United States Patent Office on July 21st, 1927, and particularly to means for lubricating such bearings.

It is my object to provide lubricating means having a readily accessible inlet opening whereby a bearing, such as that of my above identified application, may be quickly and easily packed with lubricant to effectively seal the same against the entry of injurious substances. Other objects will appear and be more fully pointed out in the following specification and claims.

In the accompanying drawings, which illustrate the best form of my device at present known to me, Figure 1 is a plan view of a conveyer roller and its supporting rails, with my improvements thereon and one end being shown in central horizontal section; Fig. 2 is an end view of the device and Fig. 3 is a section taken on the line 3—3 of Fig. 2, but with the roller body removed and the axial support and bearing closure cap shown in side view.

The device is primarily intended for rollers of the freely rotating type used in gravity conveyers. It consists of a tubular lubricant conduit 4 having an inlet opening 5 at its outer end and communicating at its inner end 6 with a lubricant receptacle 7 adjacent to an anti-friction bearing 8 within a roller body 9. The conduit 4 is fixed in a side rail 10 for supporting the roller and its inner end 6 projects through a closure cap 11 for the lubricant receptacle 7 and bearing cavity or recess which is offset inward from the end 12 of the roller body 9. A pair of supporting rails 10 are spaced apart in parallel relation to each other and the roller body 9 is mounted between the adjacent or inner faces of these rails upon an axial rod 13 extending through the tubular body 9 of the roller. The ends of the rod 13 project through holes in the rails 10 where cotter pins 14 are inserted through suitable transverse perforations in said projecting ends to retain the rod against withdrawal from the rails. The rails are also rigidly connected together in spaced, parallel relation by a transverse frame member 15.

Fixed in each end of the roller body 9, and offset inward from the end 12 thereof, is a head 16 formed with a central cup-shaped receptacle for the bearing 8. The latter bearing has the usual anti-friction balls which operate in an annular race formed in a sleeve 17. The outer end of this sleeve 17 transmits end thrust to the rail 10 and has the closure cap 11 fixed thereon. Adjacent to the head 16 is a sheet metal ring 18 which is secured to the inner periphery of the body 9 and formed with an annular flange 19 on its inner periphery. The flange 19 overlaps and extends outward adjacent to a rim 20 on the cap 11. Thus the flange 19 coacts with the rim 20 of the cap 11 and overhanging end of the roller body 9 to form efficient protection against the entry of harmful substances, whether of solid, liquid or gaseous form, into the bearing cavity or receptacle.

It will be evident that the ring 18 rotates with the roller body 9 while the closure cap 11 is fixed on the axial support for said body and is normally stationary. This cap 11 is perforated to receive the inner end 6 of the conduit 4. The outer surface of the conduit 4 is tapered toward the end 6 and said conduit is held in place by driving it into frictional engagement with the rail 10. My device may be used with rails 10 having inwardly bent-up edges 21 which overhang the ends of the roller body 9 as best shown in Fig. 3. In use these overhanging edges 21 protect the bearing by minimizing the possible spillage of solid and liquid matter over the end of the roller. The outer end of the lubricant conduit 4 is formed with a head 22 adapted to make connection with a grease compressor or hose connected thereto.

It will now be evident that the enclosed bearings within ends of the roller body 9 may be quickly and easily lubricated or packed with grease by applying a lubricant compressor or grease gun of common or suitable type to the projecting head 22 on the conduit 4. Thus the lubricant may be forced into the receptacle 7 and upon the bearing 8 where it is retained by the cap 11 and ring 18. By my arrangement of the annular clearance to permit rotation of the roller body closely adjacent to the inner periphery of said body, and within the same, highly efficient protection is afforded. The present invention is an improvement over my co-pending application above identified in that the intake end 5 of the conduit 4 is always accessible and it is unnecessary to rotate the bearing cap 11 to position where the lubricant opening is accessible as with the device of my earlier filed application.

Having described my invention what I claim is new and desire to protect by Letters Patent is:

1. The combination with a pair of side rails and a roller body mounted between the inner faces of said rails with its ends adjacent thereto, said body having recesses for bearings in its ends, bearings located within said recesses, an axial support projecting into said body from said rails, bearing closure caps extending radially outward from said support within said recesses and a lubricant conduit fixed in each of said rails and extending through perforations in said caps to deliver lubricant to said bearings, said conduits having inlet openings accessible from the outer faces of said rails.

2. The combination with a pair of side rails and a roller body mounted between the inner faces of said rails with its ends closely adjacent thereto, of bearings located within the ends of said body, an axial support projecting into said body from said rails, a stationary bearing closure cap extending radially outward from said support within an end of said body the outer rim of said cap being offset inward from the end of said body and said cap having a perforation therein, and a tubular lubricant conduit rigidly secured in said rail and extending through said perforation in said cap to deliver lubricant to said bearing, said conduit having an inlet opening accessible from the outer face of said rail.

3. In a device of the class described, the combination with a revoluble body having a bearing recess in an end, a rail adjacent to said end, an axial support in said recess, a bearing between said body and support in said recess, a ring offset inward from the end of said body, an outwardly projecting annular flange formed on the inner periphery of said ring, a closure cap for said recess secured to said support and having its outer rim adjacent to the inner periphery of said body and extending outward beyond the periphery of said flange and a conduit extending through said rail and cap for admitting lubricant to said bearing.

4. In a device of the class described, a rail, a revoluble body having a bearing recess in an end adjacent to said rail, an axial support projecting from said rail into said recess, a bearing between said body and support in said recess, an integral, circular cap secured to said support and having its outer rim adjacent to the inner periphery of said body, the end of said body overhanging said rim, said cap being formed with an opening for the admission of lubricant, and a tubular conduit secured to said rail and projecting through said opening for admitting lubricant to said bearing.

5. In a device of the class described, a rail, a revoluble body having a bearing recess in an end adjacent to said rail, an axial support in said recess, an anti-friction bearing between said body and support in said recess, a closure for said bearing recess secured to said support, said closure having an opening therein and means for admitting lubricant to said recess comprising a rigid conduit fixed in said rail and projecting through said opening into said recess.

In testimony whereof, I have hereunto signed my name to this specification.

PETER C. WEGO.